United States Patent [19]
Jones et al.

[11] B 3,985,962
[45] Oct. 12, 1976

[54] METHOD OF INFORMATION TRANSMISSION WITH PRIORITY SCHEME IN A TIME-DIVISION MULTIPLEX COMMUNICATION SYSTEM COMPRISING A LOOP LINE

[75] Inventors: Ivor Jones, Winchester, England; Hans R. Mueller, Langnau, Switzerland; Daniel Wild, Kilchberg, Switzerland; Pitro A. Zafiropulo, Horgen, Switzerland

[73] Assignee: International Business Machines Corporation, Armonk, N.Y.

[22] Filed: Aug. 12, 1974

[21] Appl. No.: 496,500

[44] Published under the second Trial Voluntary Protest Program on February 3, 1976 as document No. B 496,500.

Related U.S. Application Data

[63] Continuation-in-part of Ser. No. 279,595, Aug. 10, 1972, abandoned.

[30] Foreign Application Priority Data
Aug. 13, 1971 Switzerland.................. 11976/71

[52] U.S. Cl. .................. 179/15 AL; 179/15 AP
[51] Int. Cl.² ........................................ H04J 3/08
[58] Field of Search .............. 179/15 AL, 15 AP; 444/1

[56] References Cited
UNITED STATES PATENTS

| | | | |
|---|---|---|---|
| 3,408,632 | 10/1968 | Hauck | 340/172.5 |
| 3,597,549 | 8/1971 | Farmer et al. | 179/15 AL |
| 3,639,904 | 2/1972 | Arulpragasam | 179/15 AL |
| 3,680,056 | 7/1972 | Kropfl | 179/15 AL |
| 3,706,974 | 12/1972 | Patrick et al. | 340/172.5 |
| 3,732,543 | 5/1973 | Rocher | 179/15 AL |
| 3,755,786 | 8/1973 | Dixon et al. | 179/15 AL |
| 3,764,981 | 10/1973 | Takasugi | 179/15 AL |

Primary Examiner—Douglas W. Olms
Attorney, Agent, or Firm—Victor Siber; Jack M. Arnold

[57] ABSTRACT

A closed loop communication system in which the terminals are grouped into priority classes. Any terminal can seize a free channel if certain priority conditions exist. A channel (frame) is always preceded by a header comprising a priority request field and a priority grant field. The request field has n bits assigned to the n priority classes; a terminal requiring service sets that bit to "1" which corresponds to its class. Thus, the controller receives a compiled overall request and inserts, for the next cycle, into the grant field an indication as to which priority class or classes are now allowed access to the channel. This is accomplished by shifting the contents of the request field to the grant field. A terminal can only seize the channel if its priority class is allowed for that cycle by the grant field, and if the channel is still free.

6 Claims, 7 Drawing Figures

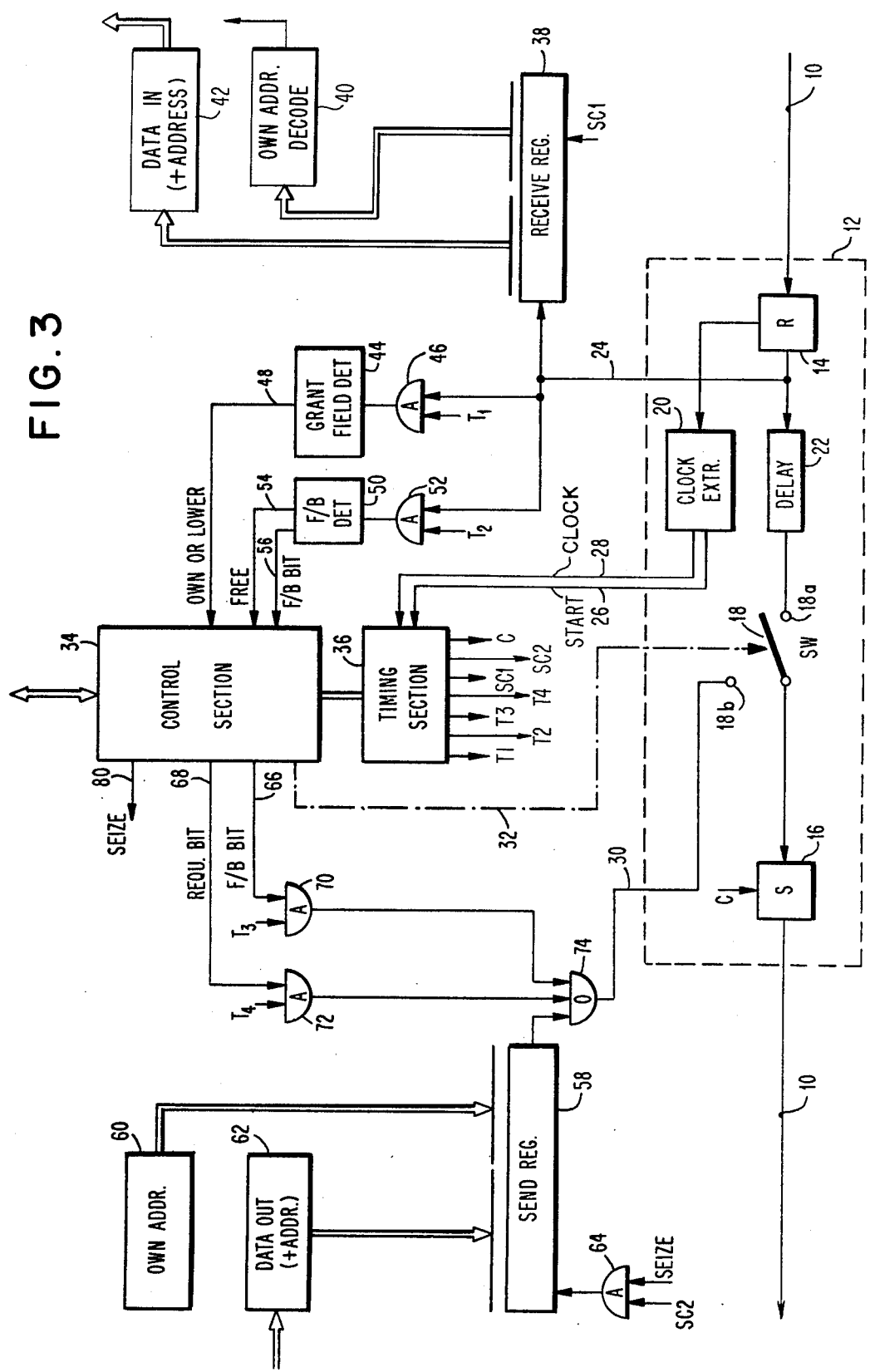

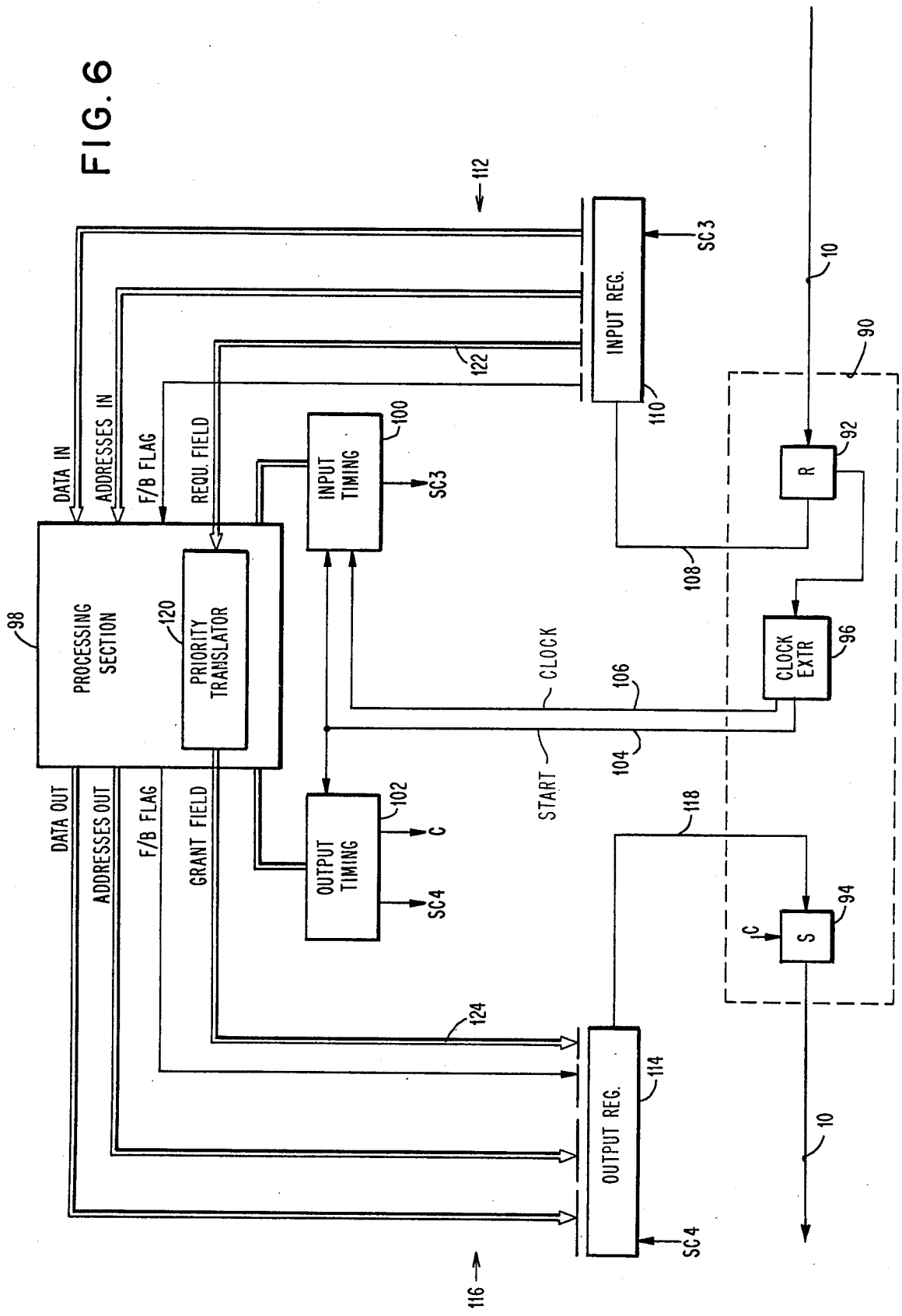

METHOD OF INFORMATION TRANSMISSION WITH PRIORITY SCHEME IN A TIME-DIVISION MULTIPLEX COMMUNICATION SYSTEM COMPRISING A LOOP LINE

CROSS-REFERENCE TO RELATED APPLICATION

This is a continuation-in-part application of Ser. No. 279,595, filed Aug. 10, 1972 now abandoned, entitled "Method of Information Transmission with Priority Scheme in a Time-Division Multiplex Communication System Comprising a Loop Line", assigned to the same assignee as the present invention.

BACKGROUND OF THE INVENTION

The present invention relates to a method of priority assignment in a time-division multiplex communication (TDM) system comprising a loop to which a plurality of terminals of different priority classes and at least one supervisory unit are attached.

In TDM loop communication systems a channel which is represented by a frame (i.e. time interval) cyclically passing on the loop can be assigned to a terminal by the loop control unit, e.g. after a polling of all terminals over the loop or over separate service and control lines. In a simpler loop system requiring less central control, channels can be seized by the terminals without assignment. This requires only the provision of a special indicator in each frame which is changed from "free" to "busy" when a terminal occupies the channel.

Within the loop system, terminals of various speeds and of different importance are attached to the same loop. This type of system requires the introduction of a priority schedule so that when simultaneous service requests occur, certain terminals are serviced prior to others having a lower priority. A loop system with centralized assignment of channels may be adapted to handle such a priority scheme at the cost of additional storage or other hardware. The simpler system providing self-occupation of channels would, however, become much more complicated by such additional means for centralized priority handling.

OBJECT OF THE INVENTION

Therefore, it is the object of this invention to provide within a loop communication system, a simplified method of channel allocation utilizing a priority basis and which method requires a minimum of additional circuitry in the terminals and the loop controller.

SUMMARY OF THE INVENTION

In accordance with this invention, a method of information transmission which utilizes a priority scheme is provided. The information is transmitted within a TDM communication system comprising a loop to which a plurality of terminals of different priority classes and at least one supervisory unit are attached. Information is transferred in the system in cyclic consecutive frames, each frame including a group of control characters. The group of control characters of any frame contain at least two fields for priority assignment. One of the fields is a request field for the insertion of channel requests by attached terminals, discernable by priority class. The other field is a grant field which indicates which priority class may occupy the transmission channel represented by the corresponding frame. The contents of the grant field are determined by the supervisory unit by use of the contents of a request field previously transmitted over the loop.

The new method for priority assignment which is disclosed here has the advantage of offering good response without requiring additional bandwidth. The method operates in a distributed way and can be applied both for centralized and decentralized loops. Also, the method applies to applications with constant or flexible message lengths. In addition, it is also possible to utilize the priority scheme with a more sophisticated terminal that can change its priority.

BRIEF DESCRIPTION OF THE DRAWINGS

FIG. 3 is a block diagram representation of those parts of a terminal which are used for priority-controlled frame requests and seizure.

FIG. 6 is a block diagram representation of the loop controller with the units that are used for processing the request and grant fields of frames.

DETAILED DESCRIPTION OF THE INVENTION

Figure 1:
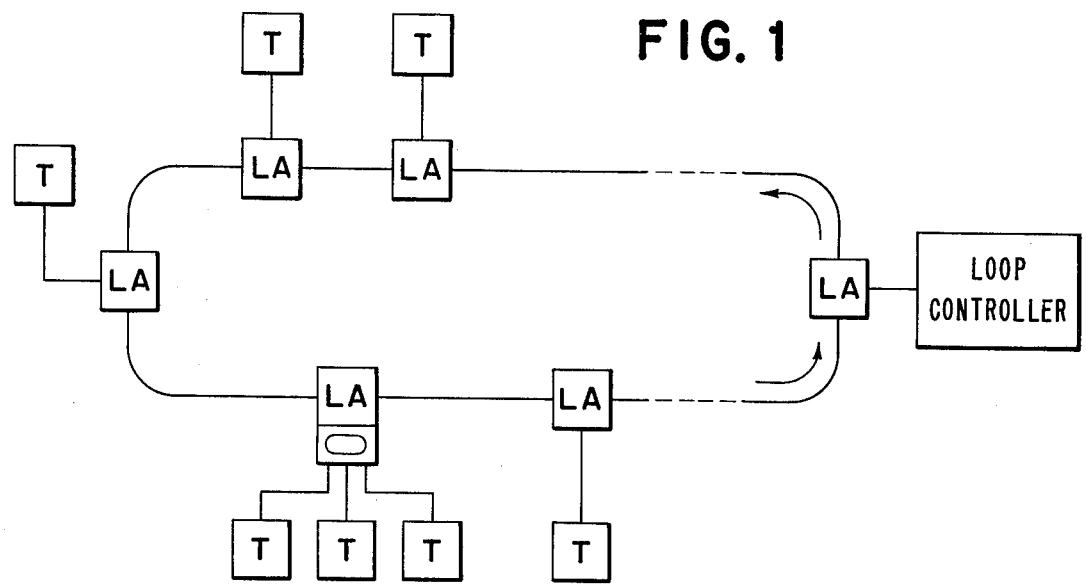
FIG. 1 is a schematic representation of a communication loop with a plurality of terminals and a loop controller attached.

A closed loop communication system in which the present invention will operate is schematically shown in FIG. 1. A number of terminals T which may include telephone sets, teletypewriters, display units or similar equipment are attached to the loop line by loop adapters LA. There may also be groups of terminals using a common loop adapter. The terminal/loop adapter combinations can watch and analyze data passing on the loop, and they can extract data from or apply data to the loop line. A loop controller is also attached to the loop by a loop adapter.

Figure 2A:
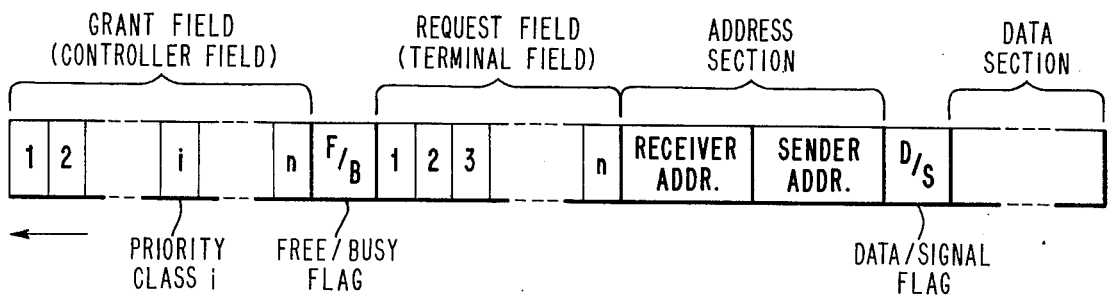
FIG. 2A is a representation of the format of a frame on a completely decentralized loop with details for the frame header.
Figure 2B:
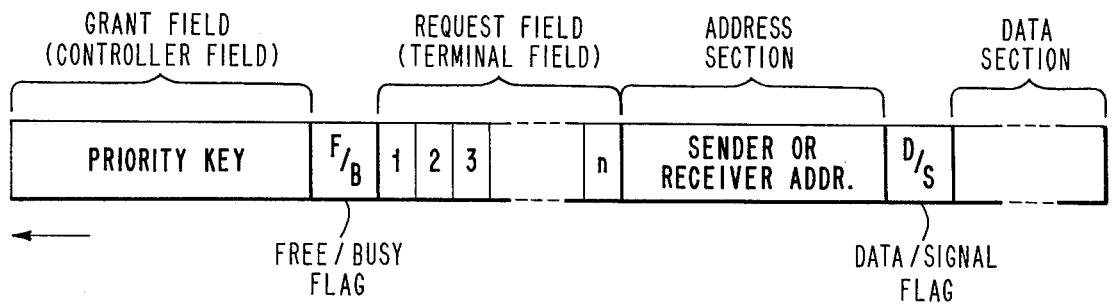
FIG. 2B is a representation of the format of a frame on a loop having some central control with details for the frame header.

Information communicated over the loop is formatted in time frames such as generally shown in FIGS. 2A and 2B, so that a time-division multiplex operation is effected. Each frame comprises an address section for identifying the sending and/or receiving terminal, and a data section for the actual data to be transmitted. The data may be coded characters, or digitalized speech or video signals. Signaling information may be transmitted instead of such data. A distinction between these two categories of information is possible by a data/signaling flag.

A free/busy flag in each frame indicates whether the corresponding communication channel is already occupied for that cycle or whether it is still available. This free/busy flag may be either a code word of several bits, or a single bit; the latter is assumed for the following description.

When the channel may be occupied for only one cycle, the loop controller resets the free/busy bit to zero each time (if it does not wish to use the channel itself), and the channel would be seized by setting this bit to one. Another possiblity which allows occupation for more than one frame cycle occurs when a terminal changes the value of the free/busy bit when it wishes to seize or to keep the channel. A terminal which does not want to seize the channel or which wants to release a channel previously occupied by it, lets the free/busy bit pass on the loop unchanged. By watching the free/busy bit in two consecutive frame cycles any terminal can determine whether the channel is free or not. Both possibilities of the F/B indication are used in the examples which are described below.

Principles of Loop Operation

The examples to be described are based on two somewhat different types of loop systems: one which is completely decentralized (called "Decentralized Loop") and one which has some central control by the loop controller (called "Centralized Loop").

Decentralized Loop

The loop controller functions merely serve to synchronize and monitor the operation of the loop. It has very limited data processing capability and exercises no (or minimum) control over the terminals which initiate and maintain their connections independently. For sending data to another terminal, a terminal seizes a free frame by changing the free/busy flag, then inserts its sender address and the receiver address as well as the data to be transmitted. Each terminal monitors the data on the loop, and if its own address appears in the receiver address field of a frame it extracts the sender address and the data from the loop. In this decentralized loop system, a terminal will keep a channel occupied until it has completely transmitted its message; i.e. it will use the frame for a number of consecutive cycles. However, an interrupt can be made when another terminal of same or higher priority requests the channel, as will be described later.

Centralized Loop

The loop controller has control of the loop operation and also has data processing capabilities. The seizing of a channel, however, is effected by the terminals themselves. The controller maintains a list of existing connections and retransmits received data to receiving terminals as specified by sending terminals. A channel can only be occupied for one cycle and a new request must be made for every additional cycle. Of course, other principles could be used, e.g. that provided for the decentralized loop (seizing of a channel for several consecutive cycles with possibility of interrupt).

The single loop and controller of FIG. 1 may be part of a larger communication system. For example, an exchange system may contain a plurality of exchange modules each with a separate closed loop attached to it. For the ease of understanding, however, only a single loop is chosen as an embodiment for describing the invention.

Priority Scheme

In a loop system with terminals of different priority classes (slow and fast working terminals) the possibility of occupying a free channel must be determined by the priority schedule. For this purpose each frame "header" is comprised of two specific fields: a request field of terminal field and a grant field or controller field.

Any terminal desiring to occupy a channel inserts an indication of its priority into the request field. When the frame header passes the loop controller a new content for the grant field is derived from the request field. Thus, the priority classes which are allowed to occupy the channel represented by that frame are designated by the grant field. Now each terminal which has requested service watches the passing grant fields and free/busy flags to detect a channel which it can occupy. The following is a more detailed description of the loop operation under a priority schedule.

Decentralized Loop

The frame structure used is shown in FIG. 2A. A terminal occupies a frame by modifying the free/busy bit value. As long as the terminal changes this bit each time in consecutive frame cycles it retains the channel. The terminal releases the channel if it leaves the free/busy bit unchanged. Thus, any termianl can detect whether the channel is free or occupied by simply observing the free/busy bit during two consecutive frame cycles. If the free/busy bit values are different, the channel is busy; if they are identical, the channel is free.

The data terminals are classified into priority classes, and the highest priority is associated with the number 1; the second highest with the number 2 and so on. The lowest priority is associated with the number $n$. The request field and the grant field (FIG. 2A) each contain $n$ bit positions. The $i$-th ($i = 1, 2, 3...n$) bit positions in each of these fields is associated with terminals in the $i$-th priority class.

Assume, for example, that a terminal belonging to the i-th priority class wants to occupy a channel (frame). For the purpose of simplification this terminal is designated "Terminal A". Terminal A begins by observing (storing) the free/busy bit value and inserting a "1" in the $i$-th bit position of the request field. Each time the frame passes the loop controller the entire bit pattern contained in the request field is shifted into the grant field after which all request field bits are set to "0". During the next frame cycle terminal A observes the grant field. If all bit positions up to and including the ($i$-1) bit have a "0" value, it is determined that no terminal of priority higher than i is requesting the channel. Therefore, if the channel is free terminal A occupies it. On the other hand, if at least one of the bit positions, up to and including the ($i$-1) bit, has a value of "1", terminal A refrains from occupying the channel so as to let some higher priority terminal use the channel first.

If terminal A can occupy the channel and the channel is free, the terminal A modifies the bit value of the passing free/busy bit. Terminal A retransmits the $i$-th bit of the request field without modification. On the other hand, if occupation is not possible terminal A repeats the initial action, it stores and remembers the passing free/busy bit value and inserts a "1" in the $i$-th bit position of the request field. By inserting a "1" in the i-th bit position, terminal A continues to request the channel so that lower priority terminals do not access the channel before terminal A has been serviced.

The described procedure enables terminals of a given priority to satisfy their transmission requirements before terminals of lower priority can do so. It also enables a high priority terminal requesting the frame to interrupt the transmission of lower priority terminals. For example, assume that during occupation of the channel by terminal A, a terminal with higher priority, say priority ($i$-2), undertakes an occupation request. Then terminal A will, during the next frame cycle, detect that the ($i$-2) bit value of the grant field has a value of "1" and will, therefore, refrain from reoccupying the frame.

Terminals belonging to the same priority category can share the channel in different ways. Two cases are considered herein. In the first and simplest case a terminal of, say, the $i$-th priority category relinquishes the channel if either a terminal of higher priority requests the channel or the terminal has completed transmission. Note that this approach has no built-in procedure to limit the occupation duration of a single terminal. In the second case a terminal also relinquishes the channel if either a higher priority terminal requests the channel or the terminal has terminated. But in addition it relinquishes the channel if one or more terminals of the same priority have made occupation requests. The following rules enable this automatic relinquishment for terminals of identical priority.

1. A terminal never modifies any bits in the request field during the time it actually occupies the channel.
2. When an occupying terminal of priority i detects that the i-th bit of the grant field is "1", it immediately relinquishes occupation. If the terminal has thereby been interrupted it begins again setting the i-th bit of the request field to "1" and continues doing this until it regains access to the channel.

The result is that, if a plurality of terminals with equal priority simultaneously overlap in their request for the channel, and higher priority terminals make no requests, then the terminals share the channel in the following manner. A terminal never occupies the channel during more than one frame cycle; and every terminal occupies the channel for an equal amount of time. If, on the other hand, only one terminal of, say, priority $i$ and no terminal of higher priority is requesting the channel, then that terminal is able to occupy the channel in a continuous manner.

Centralized Loop

As stated before, the data channel contains two fields for priority handling: one is reserved for the controller (controller field) and the other for the terminals (terminal field), as shown in FIG. 2B. If a terminal belonging to the i-th class requires service and the channel is busy, the terminal sets the i-th terminal field bit value to "1". That is, it makes a service request in the bit position corresponding to its own class. When the frame returns to the controller, the controller analyzes the terminal field for service requests. The controller may then use any priority algorithm desired in order to allocate service to one of the terminal classes. This algorithm must take into account data waiting at the loop controller which is to be sent to terminals.

If the controller itself does not have higher priority data to transmit, it responds in the following way. A key (code word) associated with the current highest priority class request is inserted in the controller field to reserve the frame for this priority class, and the free/busy flag is set to free. Then, the first terminal on the loop requiring service and belonging to this priority class effectively occupies and uses the channel. However, the controller will occupy the channel if it has higher priority data to transmit.

When the controller field contains a priority key, a terminal can seize the channel only if it has made a request during the previous channel cycle. All terminals having made such a request monitor the controller field, and if the contents of the field correspond to a terminal's priority class, and the channel is still free, that terminal can seize and occupy the channel during the current channel cycle. When these two conditions are not simultaneously fulfilled, the terminal repeats its priority request and tries to seize the channel during the next cycle. The priority key could, of course, be of the same format as that used in the terminal field (request field) i.e. a 1-out-of-$n$ representation as in the decentralized loop system described above.

Referring now to FIG. 3, there is shown a loop adapter in connection with those parts of a terminal which are used for requesting a frame and later for seizing a frame on the basis of the priority scheme disclosed herein. It should be recognized that this implementation is exemplary as there are many different possible implementations. The terminal is connected to loop 10 through loop adapter 12. Loop adapter 12 comprises a receiver 14 (R), a sender 16 (S), a loop switch 18, clock extraction unit 20, and delay means 22. The loop adapter delivers all received information on line 24 to the terminal, and a frame start signal and a clock signal are transferred on lines 26 and 28, respectively, to the terminal. The terminal can release data to the loop adapter on line 30.

Loop switch 18 has two positions 18a and 18b for transferring data signals to sender 16 either from receiver 14 or from the terminal, respectively. The switch 18 is controlled by signals appearing on line 32. The switch 18 is usually kept in position 18a and switched to position 18b only when the terminal inserts data into a frame.

The terminal has a control section 34 and connected to it is a timing section 36 which is controlled by the start and clock signals on lines 26 and 28. The timing section 36 generates timing signals in a field pattern which are in synchronism with a frame passing on the loop, for the purpose of controlling gates and input-/output operations. A receive register 38 is provided to accumulate the address and data sections of a passing frame under control of a shift clock SC1. Own address decoder 40 will release a signal to the control section if the terminal's own address is detected, and data-in unit 42 is provided for transferring received data (which may include a sender address and a data/signaling flag) into other parts of the terminal.

The grant field of each frame is transferred into grant field detector 44 by AND gate 46 under control of timing signal T1. The grant field detector 44 has a decoder which is specific for the respective terminal's priority so that a pulse will be sent to the control section on line 48 if the received grant field indicated no priority class higher than that of the respective terminal. It should be noted that the decoder in grant field detector 44 could be designed so that it can be changed to another priority class manually or by an appropriate control signal.

The Free/Busy flag of each frame is transferred to F/B detector 50 by AND gate 52 under control of timing signal T2. It releases a pulse on line 54 to the control section if the flag indicates that the frame is still free and also transfers the current flag bit on line 56 to the control section (the latter will change it to the complement to indicate a BUSY state when it seizes the frame).

A send register 58 is provided for holding information that is to be shifted to the loop for insertion into a passing frame. This information is derived from the terminal's own fixed address (kept in own address unit 60), and data from other parts of the terminal (which may include a receiver address and a data signaling flag) furnished by data-out unit 62. Data is shifted out of send register 58 under control of shift clock signal SC2 which is gated by AND gate 64 if a SEIZE signal from the control section is in the active state.

Figure 4:
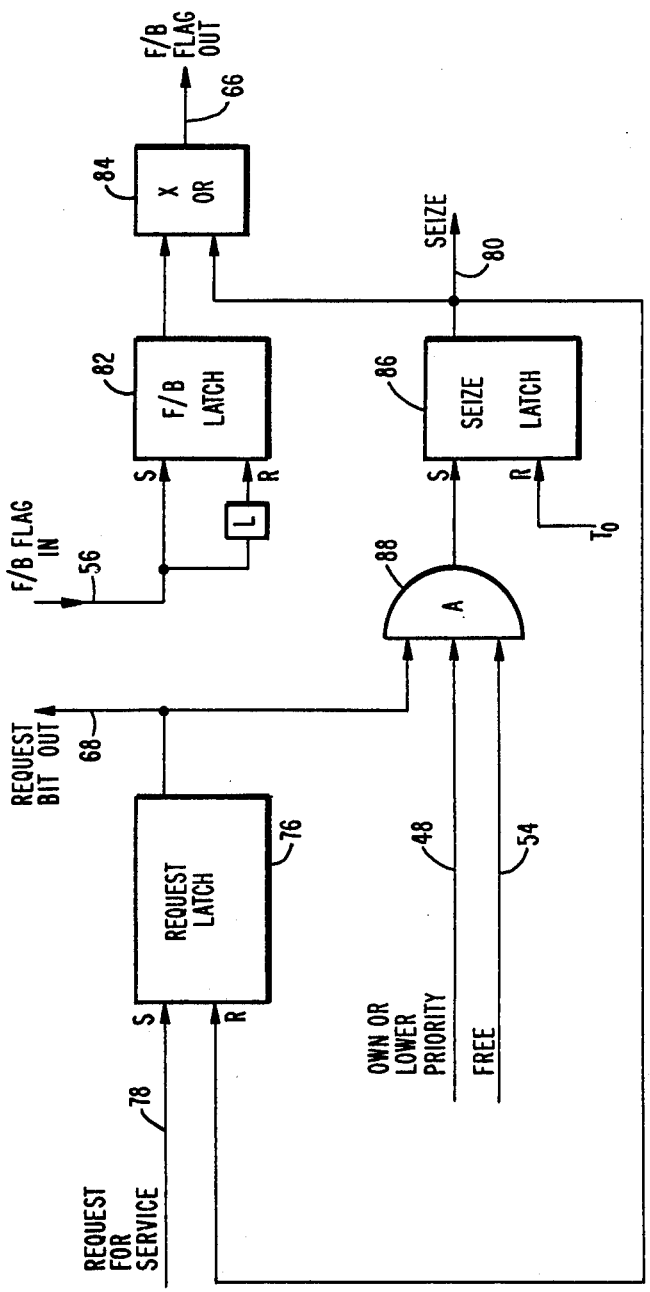
FIG. 4 is a block diagram representation of the parts within the control section of FIG. 3 which are used for requesting and seizing a frame.

An F/B flag bit appearing on line 66 and a request bit appearing on line 68 from the control section are gated by AND gates 70 and 72 under control of time signals T3 and T4, respectively. T4 corresponds to the time when that bit of the request field which is assigned to the respective terminal's priority class appears at switch gate 18. The OR gate 74 is connected to the outputs of send register 58 and AND gates 70 and 72 and transfers the respective output signals to switch position 18b which can be connected to the input of sender 16 by switch 18. The functional units that are required within control section 34 for requesting and seizing a frame are shown in FIG. 4.

Figure 5:
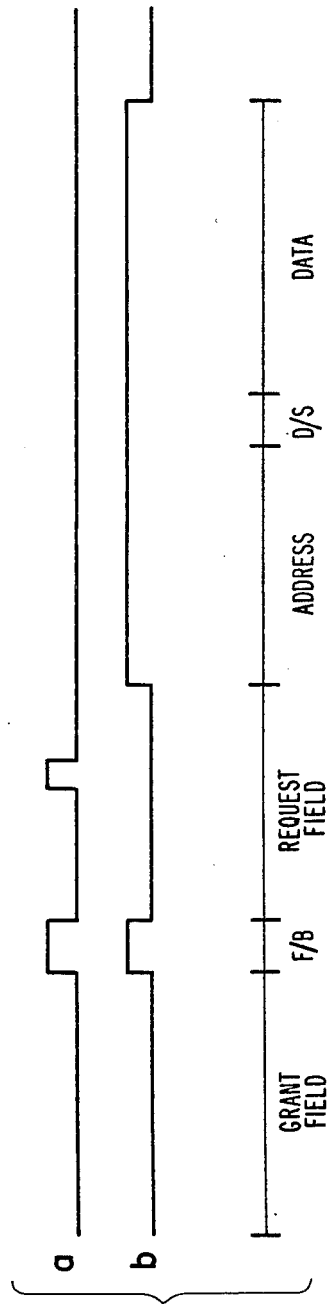
FIG. 5 is a time diagram of the signal for controlling the loop switch of FIG. 3 during a request cycle and during a seize cycle.

Request latch 76 is set whenever a REQUEST FOR SERVICE signal is generated on line 78. The state of this latch is indicated by a signal on line 68. The request latch is reset by the SEIZE signal on line 80 when a frame can be seized. F/B latch 82 is provided for holding the value of the last received F/B flag bit appearing on line 56. Exclusive OR circuit 84 either gates this bit as stored in latch 82, or its complement, to line 66, depending on the status of the SEIZE signal on line 80. A busy condition is indicated by inverting the F/B flag bit. Seize latch 86 is set when all conditions for allowing the terminal to seize the passing frame are satisfied. AND gate 88 is provided for passing a SET signal to latch 86 when active signals are present on line 48 (indicating that the terminal's priority class is allowed to seize a frame), on line 54 (indicating that the passing frame is free), and on line 68 (indicating that the terminal has made a request already). Seize latch 86 is reset by the START signal at the beginning of each frame. FIG. 5 shows the waveform of the switch control signal on line 32 (FIG. 3) during one frame cycle for two situations: (a) when the terminal requests a frame, and (b) when the terminal seizes a frame and inserts data signals. If the waveform is down, switch 18 will be in position 18a, and when the waveform is up, the switch will be in position 18b.

Operation

1. Frame Requesting

The request signal on line 78 will set request latch 76 so that, through gates 72 and 74, the request bit signal is available at switch position 18b. The switch will be operated under control of the signal shown in FIG. 5, situation a, as long as the request latch is set. Thus, the switch will be in position 18b only when F/B flag bit and the respective priority class bit appear at this point. The F/B flag bit will be reinserted, unchanged, because the SEIZE signal is inactive, but the appropriate priority bit in the request field will be set to "1" regardless of its prior value.

2. Frame Seizing

The grant field of all passing frames are analyzed and if the indicated priority is not higher than that of the respective terminal, a pulse will be sent to the control section causing the control signal for the switch to change to the waveform shown in FIG. 5, situation b. Furthermore, if the signal on line 54 indicates that the respective frame is free, seize latch 86 will be set. This will cause an inverting of the F/B flag bit stored in latch 82; the new value will be transferred through gates 70 and 74 to switch position 18b and will thus be inserted into the frame at the appropriate time. Delay unit 22 ensures that the incoming flag bit can be recognized before the change is made. The duration of this delay may be very small and depends on the operating speed of all other circuits involved.

After the F/B flag bit has been set to BUSY the request field will pass loop switch 18 unchanged. During the periods of the address, D/S, and data fields, switch 18 will be in position 18b so that no signals are passed on but rather new data signals will be inserted into the frame from send register 58 via gate 74 and line 18. At the beginning of the next frame seize latch 86 will be reset so that normal conditions are resumed (the request latch was reset earlier on by the SEIZE signal).

An exemplary loop controller together with its loop adapter is shown in FIG. 6, setting forth details for those parts which are utilized in handling the request fields and grant fields of frames. Loop adapter 90 connects the loop controller to loop 10. It comprises a receiver 92 (R), a sender 94 (S) and clock extraction unit 96. In principle, the loop adapter could be the same as those for the terminals shown in FIG. 3 but for the purpose of simplicity a special loop adapter is shown here for the loop controller. The loop controller has a processing section 98 for control, storage and other necessary functions, and timing units 100 (input timing) and 102 (output timing) connected to the processing section. Each time a frame arrives, a start signal is sent to both timing units 100 and 102 on line 104 to enable synchronization. A clock signal derived from the incoming bit stream is transferred on line 106 from clock extraction unit 96 to input timing unit 100 to enable correct reception of the whole frame. The output timing unit starts its own clock C when a new frame is shifted to the loop.

Incoming information is transferred over line 108 to input register 110 which shifts in this data under control of clock signal SC3. At appropriate times, processing section 98 accepts this input data over lines 112. All data for the new outgoing frame are placed into output register 114 from processing section 98 over lines 116. The contents of the output register are shifted out to sender 94 over line 118 under control of shift clock signal SC4 generated by output timing unit 102.

The priority translator 120 receives the request field of a stored frame on bus 122, converts it to an associated grant field which is then placed into output register 114 via bus 124. As was discussed above, the loop controller derives the grant field for a subsequent frame from the request field of a previous frame in such a way that the grant field indicates the highest priority class which had requested service. The first possibility is to just use the received control field contents as new contents for the grant field. In this case priority translator 120 would consist of a set of wires or a buffer store. Another possibility is to generate a priority key for the grant field uniquely indicating the highest class that requested service. For this procedure, priority translator 120 would consist of either a code converter matrix, e.g., diodes, or a read-only store addressed by the contents of a request field to release a grant field. Of course, a more sophisticated approach is also possible.

The code translator could for example be comprised of a functional unit which executes an algorithm based on the data received in the last frame's request field and on data stored in processing section 98 of the loop controller. Then the latter data would reflect an overall status of the loop system so that special priority handling would be possible in special situations.

Further Details

When making a request, a terminal need not analyze the terminal field (request field) to determine whether another terminal has already made a request with the same priority or a higher one. It simply sets the respective bit to "1" independently of whether that bit value is "0" or "1". This approach is extremely simple both for the terminal and the controller and reduces terminal complexity. If an error should occur in a priority bit during transmission, the error will correct itself automatically during the next channel cycle; therefore, no redundancy is needed for the priority bits in the terminal field.

It is sometimes possible that the controller field (grant field) contains a "no-priority" code because no priority requests were made during the previous channel cycle. This could occur, for example, when the controller receives a terminal field (request field) containing only "0" value bits, and the controller has nothing to transmit at that time. In such cases a terminal need not make a request before seizing the channel. The channel is seized during that cycle by the topologically first terminal requiring the transmission facility.

In all cases, however, where a terminal finds a busy channel or a priority assignment for any priority class in the grant field (controller field), it must request service in the request field and then there will be a delay of one cycle before it can try to seize the channel. This is necessary because the system must allow all terminals, at least once during a cycle, to make a service request, and the "compiled" request must be presented to the loop controller.

What is claimed is:

1. A method of information transmission with a priority scheme in a time-division multiplex communication system comprising a loop to which a plurality of terminals of different priority classes and at least one supervisory unit are attached, said method comprising the steps of:

transferring information on said loop by cyclically consecutive frames, each frame including a group of control characters;

said control characters comprising at least two fields for priority assignment, one of the fields serving as request field for the insertion of channel requests by attached terminals, discernable by priority class, and one other field serving as a grant field for characterizing which priority class may occupy the transmission channel represented by the corresponding frame;

formulating the contents of the grant field at said supervisory unit from the contents of a request field previously transmitted over the loop; and determining at each terminal, if that terminal has requested channel allocation during the preceding cycle and if the grant field of the frame in the current cycle does not contain an identification of a class with higher priority than that of the respective terminal, or if the grant field of the frame in the current cycle does not contain any priority class identification and if so, seizing the frame of the current cycle for information transmission.

2. The method as defined in claim 1 wherein the request field of any frame has one bit position provided for each priority class, said method further comprising the step of:

setting the priority class bit corresponding to the terminal requiring channel allocation, said bit corresponding to the terminal priority class.

3. The method as defined in claim 2 wherein the request field and the grant field are equal in size to each other, said step of determining the contents of the grant field further including the step of:

transferring the contents of the request field unaltered to the grant field under the control of the supervisory unit.

4. The method as defined in claim 1 further comprising the steps of:

examining the contents of a received request field at said supervisory unit;

determining the highest priority class having requested channel allocation;

inserting a coded character assigned to this class as priority key into the grant field.

5. The method as defined in claim 1 further comprising the step of:

repeating the insertion of channel allocation requests into the request fields of subsequent frames until said terminal can seize a frame when said terminal has made a previous channel allocation request which has not been serviced.

6. The method as defined in claim 1 further comprising the step of:

releasing a channel and making a new channel allocation request at said terminal when it is determined that said grant field contains the identification having a higher priority class than said terminal.

* * * * *